United States Patent [19]

Futehally

[11] 4,364,459
[45] Dec. 21, 1982

[54] ELECTROMECHANICAL COUPLING SYSTEM FOR PREVENTING A MECHANICAL DEVICE FROM OPERATING BEYOND PRESELECTED OPERATING PARAMETERS OR CONTROL PARAMETERS

[75] Inventor: Rashid Futehally, Bombay, India

[73] Assignee: Dynacraft Machine Company Limited, Bombay, India

[21] Appl. No.: 120,614

[22] Filed: Feb. 11, 1980

[51] Int. Cl.³ .................... B60K 41/02; F16D 43/284
[52] U.S. Cl. .......................... 192/0.033; 192/0.076; 192/0.096; 192/103 F
[58] Field of Search ............... 192/0.033, 0.032, 0.076, 192/0.096, 3.58, 103 R, 103 F; 60/538, 544; 307/519

[56] References Cited

U.S. PATENT DOCUMENTS

| | | | |
|---|---|---|---|
| 3,049,110 | 8/1962 | Kerr | 192/103 R |
| 3,237,734 | 3/1966 | Jania | 192/0.032 |
| 3,851,742 | 12/1974 | Summer et al. | 192/103 F |
| 3,915,271 | 10/1975 | Harper | 192/3 R |
| 3,938,631 | 2/1976 | Smith | 192/103 R |
| 4,085,373 | 4/1978 | McConnell | 307/519 X |
| 4,263,997 | 4/1981 | Poore | 192/103 R |

Primary Examiner—George H. Krizmanich
Attorney, Agent, or Firm—McAulay, Fields, Fisher, Goldstein & Nissen

[57] ABSTRACT

An electromechanical coupling system for operating a mechanical device within preselected parameters and comprising a sensor means which generates control pulses corresponding to the operating parameter sensed, an electronic control unit which is connected to the sensor means electrically and generates enabling pulses in proportion to the control pulses when the operating or control parameter of the mechanical device is within preselected values and suppresses the enabling pulses otherwise, and a coupler means located between a drive unit and a driven unit of the mechanical device for decoupling the drive unit from the driven unit when the enabling pulse is suppressed and coupling them together when the enabling pulse is present.

13 Claims, 13 Drawing Figures

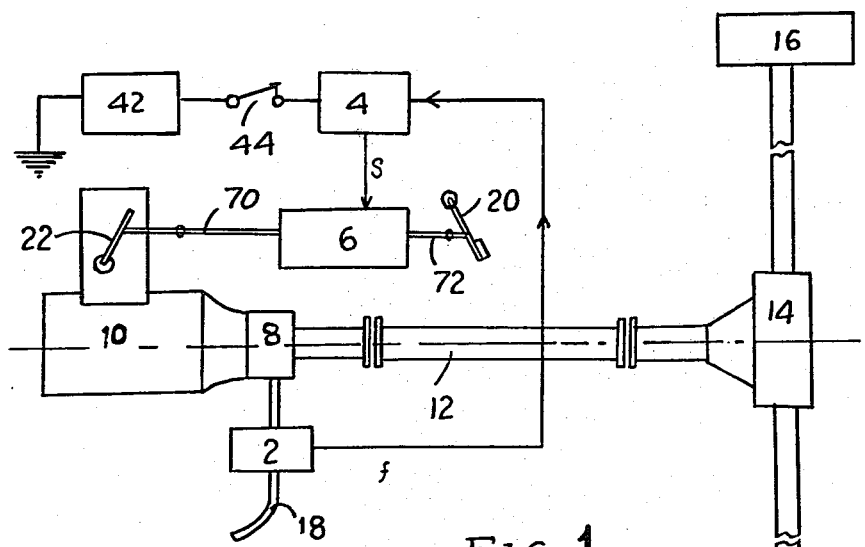
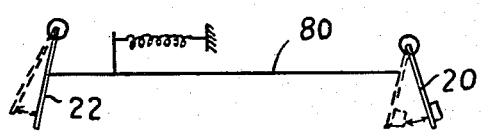
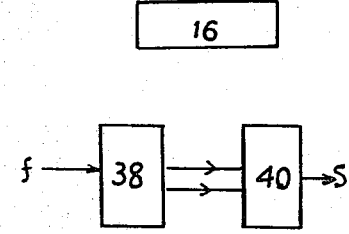
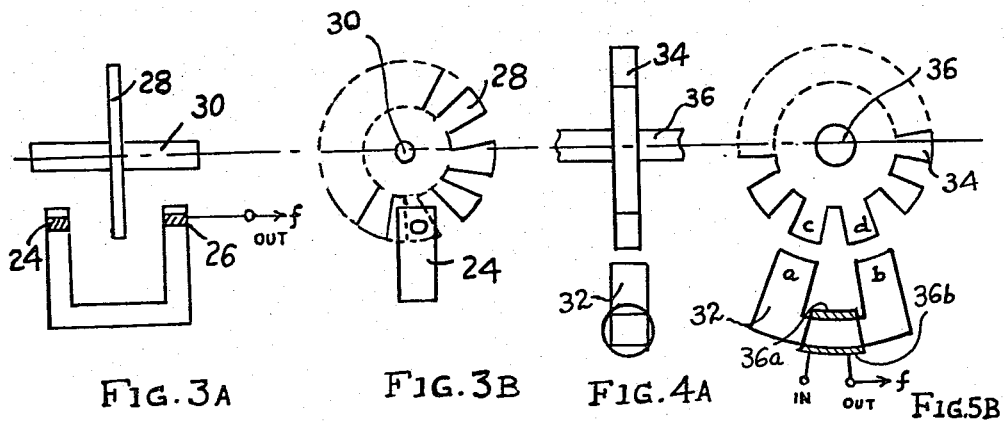
FIG. 1  FIG. 2  FIG. 5  FIG. 3A  FIG. 3B  FIG. 4A  FIG. 5B

ELECTROMECHANICAL COUPLING SYSTEM FOR PREVENTING A MECHANICAL DEVICE FROM OPERATING BEYOND PRESELECTED OPERATING PARAMETERS OR CONTROL PARAMETERS

BACKGROUND OF THE INVENTION

Field of the Invention

This invention relates to an electromechanical coupling system which prevents a mechanical device from operating beyond preselected parameters.

As used herein, the expression "mechanical device" means any machine or mechanism in which a driven unit is coupled to, and, driven by a drive unit and the operating parameter increases or decreases with the operation of the driven unit under the action of the drive unit; depending upon the specific type of machine or mechanism employed, the operating parameter may be, for instance, speed, torque, volume, pressure or temperature.

An object of the invention is to provide an electromechanical coupling system which can automatically decouple and couple the driven unit and the drive unit by either sensing a change in the operating parameter of the machine or mechanism beyond its preselected values or by sensing a change in an independent parameter, hereinafter referred to as "control parameter"; the control parameter may, for instance, comprise an external load on the mechanical device, temperature or pressure.

As aforesaid, depending upon the specific machine or mechanism employed, the operating parameter to be controlled may be, for example, linear speed, angular speed, torque, momentum, pressure, temperature or volume. As an example, a reciprocating machine may be considered in which a drive unit of large momentum operates a driven unit. In such a machine, the operating parameter to be sensed and controlled may be the angular speed of the driven unit or its torque. As another example, an internal combustion engine vehicle, such as a truck may be considered; in such a vehicle, the operating parameter to be sensed and controlled may be its road speed or the operating parameter to be controlled may be the road speed and the parameter to be sensed may be a control parameter such as, for example, the load on the vehicle, engine temperature or oil pressure in the gearbox or the engine.

Another object of the invention is to provide an electromechanical system which is operationally reliable and tamper-proof.

Another object of the invention is to provide an electromechanical system which is of sturdy construction and inexpensive to manufacture and maintain.

A further object of the invention is to provide an electromechanical coupling system which can emit an audio and/or visual alarm whenever the operating or control parameter reaches the preselected maximum value.

Another object of the invention is to provide an electromechanical coupling system which can be easily installed with the least alterations being required to be made in the mechanical device.

SUMMARY OF THE INVENTION

According to the invention, an electromechanical coupling system for operating a mechanical device within a preselected operating parameter or control parameter may comprise: sensor means operatively connected to said mechanical device for sensing changes in a control parameter or an operating parameter thereof and generating control pulses proportional to the parameter sensed; an electronic control unit, comprising a control pulse monitor unit the input whereof being connected to the output of the sensor means, and a bistable logic unit connected to the output of the monitor unit for producing enabling pulses or signals corresponding to the control pulses received thereat when the mechanical device operates within said preselected operating parameter or control parameter and suppressing said enabling pulses when the mechanical device operates at or beyond said operating parameter or said control parameter; and coupler means operatively connected between a drive unit and a driven unit of said mechanical device and responsive to said enabling pulses so as to couple or decouple said drive unit from said driven unit depending upon whether the enabling pulses are present or suppressed.

In an embodiment of the invention, said coupler means may be a magnetic coupler comprising a cylindrical electromagnet, the solenoid windings whereof being connected to the electronic control unit so as to receive the enabling pulses, said electromagnet being rigidly located at one end of a non-magnetic cylindrical casing and on its outside rigidly connected to one of said driven unit and drive unit; a spring-loaded moveable piston pole made of a magnetic material and disposed within said cylindrical casing and opposite said electromagnet with the free end thereof remote from said electromagnet extending without said cylindrical casing through a piston rod guide and rigidly connected to said drive unit if the electromagnet is connected to the driven unit and to the driven unit if the electromagnet is connected to the drive unit.

In another embodiment, said coupler means may be a magnetic rotary clutch comprising: a cylindrical non-magnetic cover with a disc guide rotatably connected to one of said driven unit and drive unit by a radial arm; a cylindrical electromagnet rigidly attached to said cover with disc guide so as to rotate therewith and disposed opposite thereof so as to define a hollow space between the poles of the electromagnet and the cover with disc guide, the solenoid winding of the electromagnet being connected to said electronic control unit so as to receive the enabling pulses; a magnetic material pole disc rigidly mounted in said hollow space and opposite the poles of the electromagnet on an axial shaft running through an aperture in said cover with disc guide, said axial shaft being rotatably connected to the drive unit if said radial arm is connected to the driven unit and to the driven unit if the radial arm is connected to the drive unit so that the pole disc can rotate about an axis common to the electromagnet and the pole disc if either the drive unit or the driven unit operates; and a plurality of depressions provided in the oppositely disposed faces of the pole disc and the pole of the electromagnet, each depression in said pole disc carrying a steel ball, which, in one instance, when the electromagnet is energised in the presence of enabling pulses and pulls the disc pole to press thereagainst, engagingly registers with a depression in the poles of the electromagnet so that the pole disc and said electromagnet act as one body, and which in another instance, when the electromagnet is not energised in the absence of enabling pulses and the disc pole is not pressed thereagainst, rolls freely against the face of the poles of the electromagnet so that the said pole disc and said electromagnet act independently of each other.

In yet another embodiment, the coupler means may comprise: a fluid pressure actuated master cylinder having a piston which is spring-loaded and connected to one of said drive unit and driven unit; a fluid pressure actuated slave cylinder having a piston which is spring-loaded and can be connected to said driven unit if the master cylinder piston is connectable to the drive unit and to the drive unit if the master cylinder piston can be connected to the driven unit; the pressure spaces of said master cylinder and said slave cylinder being connected to each other through a pressure pipe and to a fluid reservoir through a connecting pipe fitted with an OPEN-CLOSE valve and through a return flow pipe fitted with a one-way valve which one-way valve permits fluid flow from said reservoir into the pressure spaces; and an actuating device for operating said OPEN-CLOSE vale, said actuating device being operatively connected to said electronic control unit so that under the action of the enabling pulses it opens and closes said OPEN-CLOSE valve.

Preferably, said piston of the master cylinder may be spring-loaded such that in the absence of an external force the piston retracts to a position at which the volume of the pressure space is maximum, and the piston of the slave cylinder may also be spring-loaded such that in the absence of an external force the piston retracts to a position at which the volume of the pressure space is minimum.

In another embodiment, the coupler means may comprise: a fluid pressure actuated cylinder whose piston can be connected to one of said drive unit and driven unit and whose casing is connected to said driven unit if the piston can be connected to said drive unit and to said drive unit if said piston can be connected to said driven unit; at least one of said piston and cylinder casing being spring-loaded; the pressure space of said cylinder being connected to a fluid reservoir through a connecting pipe fitted with an OPEN-CLOSE valve and through a return flow pipe fitted with an one-way valve which permits fluid flow only from said fluid reservoir to said pressure space; and an actuating device being operatively connected to said electronic control unit so that under the action of the enabling pulses it opens and closes said OPEN-CLOSE valve.

In a preferred embodiment, said mechanical device may be the engine of an internal combustion vehicle, in which the drive unit may be the accelerator pedal and said driven unit may be a throttle lever or an injector pump control lever. In such an embodiment, by employing the electromechanical coupling system according to the invention, it would be possible to achieve various different objectives, such as preventing over-speeding of the vehicle or prevent its movement if it is over-loaded or if the engine is over-heated or if the oil pressure in the engine or in the gearbox different is from a desired value.

According to an aspect of the invention, where it is desired to prevent over-speeding, the operating parameter and the control parameter may be the road speed of the vehicle itself; i.e the road speed may be sensed and controlled, and the sensor means may be a speed sensor adapted to be coupled to any rotating member of the vehicle whose rotational speed is proportional to the road speed, and said control pulse monitor unit may be a conventional frequency monitor unit. In a modification, the speed sensor may comprise a light source, a photosensitive diode and a rotatable shaft carrying an interrupter arm adapted to interrupt a light beam from said light source to said diode, said rotatable shaft being coupled to any rotating member of the vehicle whose rotational speed is proportional to the road speed, and an output from said photosenstive diode being connected to the control pulse monitor unit. According to another embodiment, the speed sensor may comprise a magnetic yoke pole carrying an input winding which remains continuously energised and an output winding connected to the electronic control unit, a rotatable shaft carrying a slotted disc whose teeth match the yoke ends of said yoke pole said rotatable shaft being coupled to any rotating member of the vehicle whose rotational speed is proportional to the road speed.

According to another aspect of the invention, where it is desired to prevent the vehicle from moving, even though the engine may be running, if the vehicle is over-loaded, the operating parameter to be controlled may be the road speed of the vehicle and the control parameter to be sensed may be the load on the vehicle; the sensor means may be a conventional over-load sensor located on the vehicle such that it can sense that the vehicle is over-loaded and generate corresponding control pulses; said pulse monitor unit may be a conventional frequency monitor unit.

According to a further aspect of the invention, where it is desired to prevent the vehicle from moving, even though the engine is running, if the engine temperature is different from an acceptable value, the operating parameter to be controlled may be the road speed of the vehicle and the control parameter to be sensed may be the engine temperature; the sensor means may be a conventional temperature sensor that can sense the engine temperature and generate corresponding control pulses; and said pulse monitor unit may be a conventional frequency monitor unit.

According to another aspect of the invention, where it is desired to prevent the vehicle from moving, even though the engine may be running, if the engine or gearbox oil pressure is different from normal, the operating parameter to be controlled may be the road speed of the vehicle and the control parameter to be sensed may be the oil pressure; the sensor means may be a conventional fluid pressure sensing device which generates corresponding control pulses; and said pulse monitor unit may be a conventional frequency monitor unit.

BRIEF DESCRIPTION OF THE DRAWINGS

The various embodiments of the invention will now be described, by way of example, with particular reference to an internal combustion engine vehicle such as a truck vehicle. In the accompanying drawings:

FIG. 1 is a schematic block and line diagram showing the layout and arrangement of the electromechanical coupling system as fitted to a truck;

FIG. 2 is a schematic view showing a conventional arrangement for coupling the accelerator pedal to the throttle lever;

FIGS. 3A,3B are respectively, an end view and a side view of an embodiment of the sensor means shown in FIG. 1;

FIGS. 4A,4B are respectively, an end view and a side view of another embodiment of the sensor means;

FIG. 5 is a block diagram of the electronic control unit shown in FIG. 1;

DISCLOSURE

Figure 6:
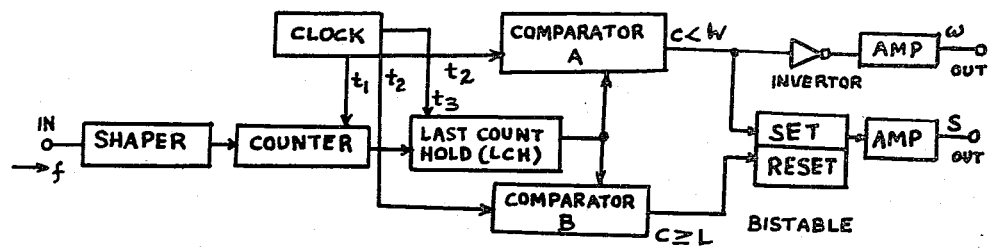
FIG. 6 is a block diagram of an embodiment of the electronic control unit shown in FIG. 1 and FIG. 5.

Referring to FIG. 1, the electromechanical coupling system consists of a sensor means 2, which senses the operating parameter to be controlled or the control parameter and generates control pulses; an electronic control unit 4 connected to the output of the sensor means to receive the control pulses, and as described hereinbelow, to generate enabling pulses under the action of the control pulses when the operating parameter or the control parameter is within a preselected range and suppresses the enabling pulses when the operating parameter or the control parameter equals or exceeds the preselected value; and a coupler means 6 which is actuated by the enabling pulses. These three means 2, 4, 6 in combination comprise the entire coupling system.

As shown, the sensor means is a speed sensor 2 fitted on the gear box 8 of the vehicle of which the engine 10, shaft 12, differential 14, wheels 16, speedometer cable 18, accelerator pedal 20 and throttle lever 22 ony are shown. The speed sensor's function is to generate a control pulse which is proportional to the vehicle speed. Two embodiments of the speed sensor which can perform such function are shown in FIGS. 3A, 3B and FIGS. 4A, 4B. The speed sensor shown in FIGS. 3A, 3B consist of a light source 24 and a photosensitive diode 26, an interrupter arm 28 mounted on a rotatable shaft 30 and disposed so as to intermittently interrupt the light beam reaching the photosensitive diode 26 from the light source 24. The rotatable shaft is coupled to the gearbox so as to revolve at an angular speed proportional to the road speed. The action of the interrupter arm therefore produces a control pulse of a frequency (f) which is proportional to the vehicle speed.

The speed sensor shown in FIGS. 4A, 4B is based on magnetic induction coupling and has a magnetic yoke 32 whose upper ends match the teeth in a slotted disc 34 mounted on a rotatable shaft 36. The yoke 32 carries an input winding 36a and an output winding 36b whose input winding is continuously kept energised. The shaft 36 is coupled to the gearbox as in the earlier embodiment shown in FIGS. 3A, 3B; the slotted disc 34 therefore rotates at an angular speed proportional to the vehicle speed and causes its teeth alternately to match and mismatch with the yoke pole ends. The rise and fall in the magnetic flux passing through the circuit a-c-d-b-a generates a pulsed current (control pulse) at the output coil 36b of a frequency (f) which is proportional to the vehicle speed.

The electronic control unit which receives the control pulses receives its power supply from the vehicle's electrical system such as a battery 42 to which it is connected through a switch 44 (FIG. 1). Referring to FIG. 5, the electronic control unit essentially consists of a conventional frequency monitor unit 38, which serves to monitor the control frequency (f), and a bistable logic unit 40 which generates enabling pulses for controlling the operation of the coupler means 6 (FIG. 1). In other words, if:

L = limit speed of the vehicle;
W = vehicle speed close to the limit speed (W < L);
f = control pulse frequency;
then the electronic control unit 4:
generates an audio/visual warning signal (w) when $f \geq W$;
generates enabling signal or pulse (S = 1) when f < L;
suppresses enabling pulses (S = 0) when $f \geq L$.

Figure 7:
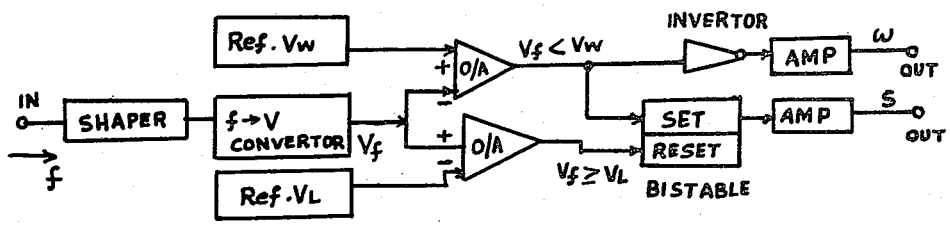
FIG. 7 is a block diagram of another embodiment of the electronic control unit.
Figure 8:
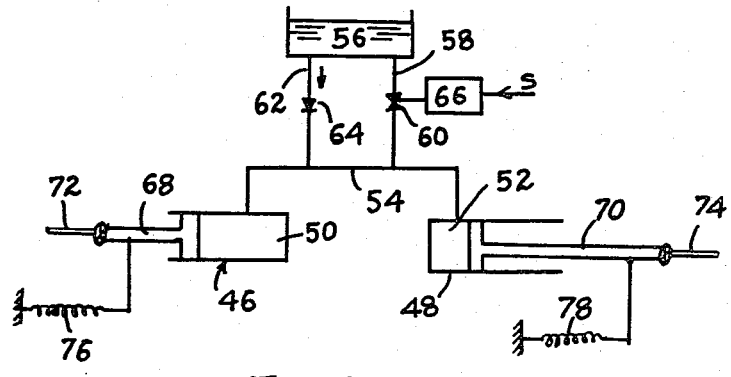
FIG. 8 is a block and line diagram of an embodiment of the coupler means shown in FIG. 1.

To understand the abovementioned generation of appropriate pulses and the performance of the electronic control unit 4, reference may be made to the two embodiments thereof shown in FIGS. 6 and 7. In the embodiment shown in FIG. 6, the electronic control unit is a digital logic circuit comprising a SHAPER which converts the control pulses (f) into pulses having a shape or size compatible with the rest of the circuit; a CLOCK which produces steady signal pulses at fixed time intervals t1, t2, t3; a COUNTER which counts the number of incoming pulses(f) in the period t1 to t1; a LAST COUNT HOLD (LCH) which receives the count from the COUNTER at time t1 and holds it till time t3 such that during time t1 to t3 the count is available to two COMPARATORS A and B, and at time t3 resets to zero. The comparator A compares the count in the LCH to W at time t2 and if the count is less than W, produces a steady signal c < W, whereas the comparator B compares the count in the LCH to L and if the count is more than L, produces a steady signal $c \geq L$. The circuit also includes a bistable unit which operates in two states, SET and RESET, and remains in one state until triggered to change by the control pulse c < W or c > W; an INVERTOR which inverts the signals c; and amplifiers (AMP) which amplify the signals to appropriate value for driving output devices such as the audio/visual device and the coupler means.

During operation, the control pulses (f) are received and shaped in the SHAPER; the shaped signals are then counted in the COUNTER within the time period t1 to t1 (which may be 1 second for instance). The number of pulses within this period are immediately transferred to the LCH at time t1 and a new count started in the COUNTER. At time t2 this is compared in the two comparators A and B against preselected values of W and L. The comparison to W produces a signal c when the count is less than W (i.e. indicating that the vehicle speed is less than warning speed). This causes the bistable unit to go to SET state and give an output (enabling pulse) which after amplification in the amplifier AMP serves to drive the coupler means i.e. at all speed below W the bistable is held to SET. When the vehicle exceeds W, the signal disappears, which causes the audio/visual warning signal w to appear through the INVERTOR and the corresponding amplifier AMP. The comparison to L produces a signal when $c \geq L$ (i.e. when vehicle speed is equal to or exceeds L). This signal resets the bistable unit, cutting off the enabling signals or pulses (S = 0). When the vehicle begins to decelerate, first the signal $c \geq L$ disappears and the signal c < W appears; this signal causes the bistable to move into SET state and the enabling signal reappears (S = 1).

In the embodiment shown in FIG. 7, the electronic control unit 4 is a digital and analog circuit comprising a SHAPER, BISTABLE, INVERTOR and AMPLIFIER (AMP) as in FIG. 6 and in addition has a f→V convertor which converts the shaped input control frequency (f) into a voltage value V proportional thereto; a Ref.$V_W$ and Ref.$V_L$ units which generates a steady fixed voltage level corresponding to the value produced by the f→V convertor when f=W and f=L respectively; and operational amplifiers (O/A) having two inputs (+) and (−) and, being analog devices, having the characteristic that they produce an output when (+) is greater than (−) and zero output when (+) input is $\leqq$(−) input.

In operation, the bistable is held in SET mode at all times while $V_f < V_W$ (i.e. vehicle speed is below warning speed). When $V_f \geqq V_W$, warning signal w appears and the SET signal removed from the bistable. When $V_f \geqq L$ (i.e. vehicle speed is $\geqq$ limit speed), the bistable is RESET, removing the enabling signal or pulse from the coupler means (S=0). When the vehicle speed reduces below the warning speed then $V_f < V_W$ and the bistable moves in the SET mode again, thereby generating enabling signal (S=1) once again for operating the coupler means.

Different embodiments of the coupler means 6, to which the output from the electronic control unit goes, are illustrated in FIGS. 8 to 11. In the embodiment shown in FIG. 8, the coupler means consists of a fluid pressure actuated master cylinder 46, a fluid pressure actuated slave cylinder 48 with their pressure spaces 50,52 respectively connected to each other through a pressure pipe 54 and to a fluid reservoir 56 through a connecting pipe 58 fitted with an OPEN-CLOSE valve 60 and through a return flow pipe 62 fitted with a one-way valve 64 which valve permits the flow of fluid from the reservoir to the pressure spaces only. The OPEN-CLOSE valve 60 is electrically operated by a solenoid 66 (actuating device) which is actuated by the enabling pulses. The piston 68 of the master cylinder and the piston 70 of the slave cylinder are connected respectively through link rods 72 and 74 to the accelerator pedal 20 (drive unit) and the throttle lever (driven unit) as shown in FIG. 1 (or to an injector pump control lever in the case of a Diesel engine vehicle). The piston 68 of the master cylinder 46 is tensioned by springs 76 so as to maximise the volume of the pressure space 50 and the piston 70 of the slave cylinder is tensioned by springs 78 so as to minimise the volume of the pressure space 52; also, the pistons 68,70 are so connected to the accelerator pedal and the throttle lever, respectively, as to ensure that their "rest" position under the action of the respective springs corresponds to the "idle" position of the pedal and the throttle lever. The reservoir and the fluid spaces can be filled with hydraulic or pneumatic fluid.

As described hereinbefore, the electronic control unit generates enabling pulses (S=1) so long as the vehicle speed does not equal or exceed the limit speed L and suppresses such pulses (S=0) when the vehicle speed equals or exceeds the limit speed L. In the first instance, the enabling signals cause the solenoid 66 to close the OPEN-CLOSE valve 60. In such condition, when the pedal 20 is pressed ("increase" speed stroke), the pressure space 50 in the master cylinder 46 is reduced and because of fluid transfer from the pressure space 50 to the pressure space 52 through pressure pipe 54, the connecting pipe being closed, the throttle lever 22 is moved to open the throttle. On the other hand, if the pedal is released ("reduced" speed stroke), the fluid is transferred back from pressure space 52 to pressure space 50 and the throttle lever moves back to close the throttle. The pedal 20 and the throttle lever 22 are thus operatively coupled so long as the OPEN-CLOSE valve 60 remains closed and the coupler means 6 acts in the same manner as the rigid link rod 80 provided conventionally between the accelerator pedal and the throttle lever as shown in FIG. 2. In the second instance, where the vehicle speed equals or exceeds the limit speed L, the speed sensor generates a control frequency (f) which exceeds the frequency corresponding to the limit speed L and the electronic control unit 4 cuts off the enabling pulse (S=0) as described hereinbefore. This results in the opening of the OPEN-CLOSE Valve 60 and therefore the transfer of the fluid from the pressure space 50 to the fluid reservoir 56 and not into the pressure space 52, when the accelerator pedal is pressed, and the throttle lever does not operate. In other words, the pedal and the throttle lever are decoupled. The vehicle therefore loses speed until it drops below the limit speed and the enabling signals are once again generated. In the intermediate period, when the vehicle is losing speed the fluid in the reservoir 56 returns to the pressure spaces 50 and 52 through the one-way valve 64.

Figure 9:
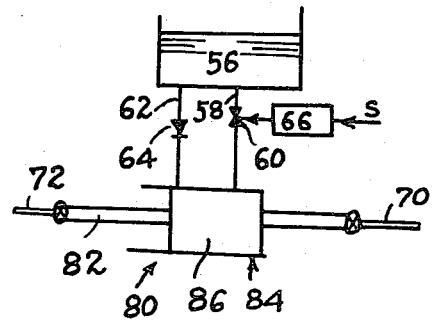
FIG. 9 is a diagrammatic view of another embodiment of the coupler means.

Similar control is obtained with the coupler means shown in FIG. 9. It employs a single cylinder 80 with the piston 82 connected to the pedal 20 and with the casing 84 connected to the throttle lever 22 through link rods 70 and 72 respectively. The fluid space 86 is connected to the fluid reservoir 56 by the connecting pipe 58 provided with an OPEN-CLOSE valve 60, operated by a solenoid 66, and a return flow pipe 62 provided with a one-way valve 64 which valve permits flow of fluid from the reservoir to the pressure space only. So long as the solenoid operates OPEN-CLOSE valve 60 remains closed under the influence of the enabling signals, the pressure applied to the pedal causes a compression of the fluid space 86, which compression operates on the casing and moves it to operate the throttle lever 22; the pedal and the throttle lever thus remain coupled. In the other instance, when the speed limit is equal or exceeded, the enabling signals are suppressed and the OPEN-CLOSE valve opens; this results in the fluid being transferred from the pressure space 86 to the reservoir 56 and so uncouples the pedal from the throttle lever as in the earlier embodiment shown in FIG. 8.

Figure 10:
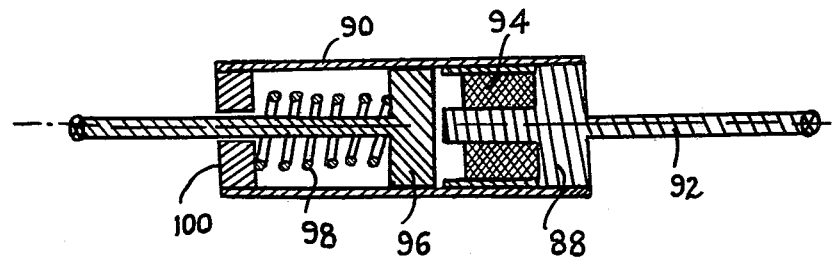
FIG. 10 is a diagrammatic longitudinal section of yet another embodiment of the coupler means.

The embodiment of the coupler means shown in FIG. 10 is a magnetic coupler consisting of a cylindrical electromagnet 88 fixed inside and at one end of a cylindrical non-magnetic casing 90; on its outside, the electromagnet is connected to the throttle lever 22 by a rigid rod member 92, while its solenoid windings 94 are connected to the electronic control unit 4 (FIG. 1) for receiving the enabling pulses. Disposed opposite the electromagnet and adapted to move axially within the casing 90 is a spring-loaded piston rod 96 (springs are designated 98) made of magnetic material; the piston rod extends without the casing through a piston rod guide 100 and is connected to the accelerator pedal 20. In operation, the enabling pulses flowing through the solenoid windings 94 energise the electromagnet which attracts the piston rod and therewith acts as one body; when therefore the pedal is pressed, its action is transmitted to the throttle lever via the electromagnet and the piston rod, and the magnetic coupler acts in the same manner as the rigid link rod 80 provided conventionally between the accelerator pedal and the throttle lever (see FIG. 2) and like, the link rod 80, may set in the "tension" mode, as illustrated in FIG. 2, when the pedal is pressed to open the throttle or with obvious modification in the "compression" mode. On the other hand, when the enabling pulses are suppressed (S=0), the action of the pedal is not transmitted to the throttle lever since the piston rod and the electromagnet act independently of each other. The pedal and the throttle lever are therefore uncouple when the vehicle speed equals or exceeds the limit speed L and coupled together so long as the vehicle speed is below the speed limit L.

Figure 11:
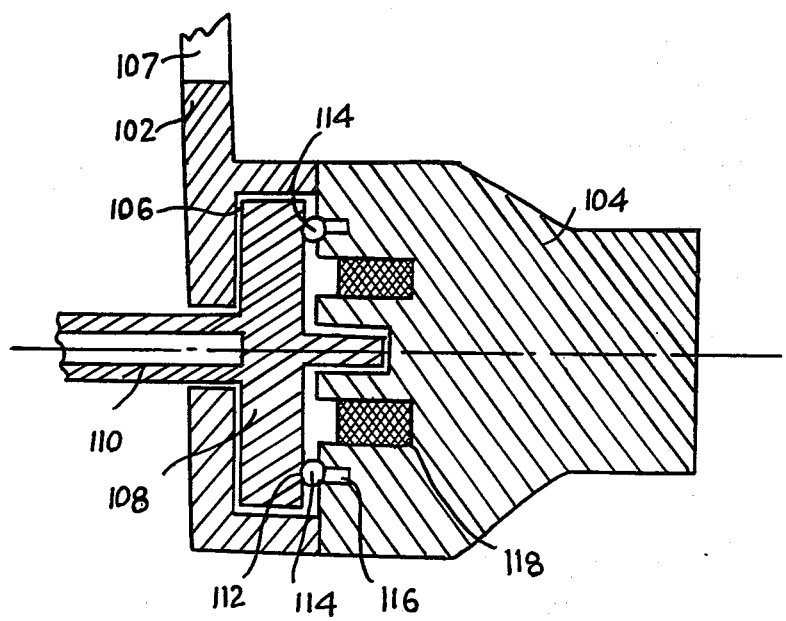
FIG. 11 is a diagrammatic longitudinal section of a further embodiment of the coupler means.

The embodiment of the coupler means shown in FIG. 11 is a magnetic rotary clutch comprising a cylindrical non-magnetic cover with a disc guide 102, a cylindrical electromagnet 104 attached rigidly to said cover with disc guide 102 and disposed in spaced-apart relationship therewith so as to define a hollow space 106 between the poles 108 of the electromagnet 104 and the cover and disc guide 102 and the magnetic material pole disc 108 rigidly mounted in said hollow space 106 on an axial shaft 110 extending without said hollow space through an aperture in the cover and disc guide 102; in effect, the pole disc is located opposite the poles of the electromagnet. A plurality of depressions are provided in the oppositely disposed faces of the pole disc and the poles of the electromagnet; the depressions 112 in the pole disc are concave depressions deep enough to carry a plurality of steel balls 114 which abut the face of the poles of the electromagnet and roll thereagainst in one instance or register with the small diameter apertures 116 in the poles of the electromagnet in another instance as explained hereinbelow. The solenoid winding 118 of the electromagnet 104 is connected to the output of the electronic control unit for receiving the enabling pulses. The cover with disc guide 106 is connected to the throttle lever through a radial lever 107 in any known manner such that when the electromagnet turns or rotates about an axis common to it and to the pole disc 108, the throttle is moved linearly; similarly the pole disc and the axial shaft 110 are connected to the accelerator pedal in such known manner that when the pedal is pressed, the pole disc rotates about said common axis. Being known, the actual modes of connection of the radial arm 107 to the throttle lever and of the axial shaft to the pedal are omitted in the drawings.

In operation, when the vehicle speed is less than the limit speed L, enabling pulses energise the solenoid windings of the electromagnet and this causes the electromagnet 104 to pull the pole disc 108 towards itself such that the steel balls 114 carried in the depressions 112 roll into corresponding depressions in the poles of the electromagnet when the pedal is pressed and the pole disc is made to rotate. Since the balls 114 are held in the depressions 116 under pressure, the electromagnet also rotates with the disc pole 108; in other words, the pedal and the throttle lever are coupled together and any movement of the pedal cause the throttle lever to move likewise and operate the throttle. When the vehicle speed equals or exceeds the limit speed L, the enabling signals are cut off and the electromagnet de-energised; this results in the pressure of the pole disc against the electromagnet to disappear. In this case, if the pedal is pressed, the steel balls merely travel across the face of the poles of the electromagnet (since the depressions 16 are too narrow to trap the balls) and the pole disc rotates without rotating the electromagnet; in other words, the pedal and the throttle lever are effectively uncouple and any movement of the pedal does not increase the speed of the vehicle. The vehicle thus loses speed till the vehicle speed falls below the limit speed and the enabling signals appear once again and the pedal once again coupled is to the throttle lever.

The aforesaid embodiments describe the construction and operation of the electromechanical coupling system for a case where it is desired to prevent over-speeding. By using suitable known sensor means, such as a load sensor, temperature sensor or a pressure sensor, the system would function in an identical manner as in the embodiments described hereinbefore and prevent movement of the vehice even if the engine is running, if the vehicle is over-loaded or if the engine temperature or the pressure of the oil in the engine or in the gearbox is different from a preselected value. Similar results can be obtained with various mechanical devices, other than an IC engine considered in the embodiment described hereinbefore, where a driven device is required to be operated by the action of a drive unit through some intermediate coupling means.

We claim:

1. An electromechanical coupling system for operating a mechanical device within a preselected operating parameter or control parameter, comprising:
    sensor means operatively adapted to be connected to said mechanical device for sensing changes in a control parameter or an operating parameter thereof and generating control pulses proportional to the parameter sensed;
    an electronic control unit comprising a control pulse monitor unit having its input connected to the output of the sensor means and a bistable logic unit connected to the output of the monitor unit for producing enabling pulses or signals corresponding to the control pulses received thereat when the mechanical device operates within said preselected operating parameter or control parameter and for suppressing said enabling pulses when the mechanical device operates at or beyond said operating parameter or control parameter; and,
    coupler means operatively connected between a drive unit and a driven unit of said mechanical device and responsive to said enabling pulses so as to coupled or uncouple said drive unit from said driven unit depending upon whether the enabling pulses are present or suppressed.

2. A system as claimed in claim 1, in which said coupler is a magnetic coupler comprising:
    a cylindrical electromagnet having solenoid windings connected to said electronic control unit so as to receive said enabling control pulses, said electromagnet being rigidly located at one end of a non-magnetic cylindrical casing and on its outside being rigidly connected to one of said driven unit and drive unit;
    a spring-loaded movable piston rod made of a magnetic material and disposed within said cylindrical casing and opposite said electromagnet with the free end thereof remote from said electromagnet extending without said cylindrical casing through a piston rod guide and adapted to be rigidly connected to said drive unit when the electromagnet is connected to the driven unit and the electromagnet is connected to the drive unit.

3. A system as claimed in claim 1, in which said coupler means is a magnetic rotary clutch comprising:
    a cylindrical non-magnetic cover having a disc guide adapted to be rotatably connected to one of said driven unit and drive unit by a radial arm;

a cylindrical electromagnet rigidly attached to said cover with disc guide so as to rotate therewith and disposed in spaced-apart relationship therewith so as to define a hollow space between the poles of the electromagnet and said cover, the solenoid windings of the electromagnet being connected to said electronic control unit so as to receive the enabling pulses;

a magnetic material pole disc rigidly mounted in said hollow space and opposite the poles of the electromagnet on an axial shaft running through an aperture in said cover and disc guide, said axial shaft being rotatably connected to the drive unit when said radial arm is connected to the driven unit and to the driven unit and the radial arm is connected to the drive unit so that said pole disc can rotate about an axis common to the electromagnet and the pole disc and either the drive unit or the driven unit operates;

a plurality of depressions in the oppositely disposed faces of the pole disc and the poles of the electromagnet, each depression in said pole disc carrying a steel ball which in one instance, when the electromagnet is energised in the presence of enabling pulses and pulls the disc pole to press thereagainst, engagingly registers with a depression in the poles of the electromagnet so that said pole disc and said electromagnet act as one body, and which in another instance, when the electromagnet is not energised in the absence of enabling pulses and the disc pole is not pressed thereagainst, rolls freely against the face of the poles of the electromagnet so that said pole disc and said electromagnet act independently of each other.

4. A system as claimed in claim 1, in which said coupler means comprises:

a fluid pressure actuated master cylinder having a piston which is spring-loaded and adapted to be connected to one of said drive unit and driven unit;

a fluid pressure-actuated slave cylinder having a piston which is spring-loaded and connected to said driven unit when the master cylinder piston is connected to the drive unit, and to the drive unit when the master cylinder piston is connected to the driven unit;

the pressure spaces of said master cylinder and said slave cylinder being connected to each other through a pressure pipe and to a fluid reservoir through a connecting pipe fitted with an OPEN-CLOSE valve and through a return flow pipe fitted with a one-way valve allowing fluid flow from said reservoir into the pressure spaces; and, an actuating device for operating said OPEN-CLOSE valve, said actuating device being operatively connected to said electronic control unit so that under the action of the enabling pulses it opens and closes said OPEN-CLOSE valve.

5. A system as claimed in claim 4, wherein said piston of the master cylinder is spring-loaded whereby, in the absence of an external force, said piston retracts to a position at which the volume of the pressure space is maximum, and wherein said piston of said slave cylinder is spring-loaded whereby, in the absence of an external force, said piston retracts to a position at which the volume of said pressure space is minimum.

6. A system as claimed in claim 1, in which said coupler means comprises:

a fluid pressure actuated cylinder having a piston adapted for connection to one of said drive unit and driven unit, and a casing which can be connected to said driven unit when said piston is connected to said drive unit, and to said drive unit when said piston is connected to said driven unit, at least one of said piston and cylinder casing being spring-loaded;

the pressure space of said cylinder being connected to a fluid reservoir through a connecting pipe fitted with an OPEN-CLOSE valve and through a return flow pipe fitted with an one-way valve allowing fluid flow only from said fluid reservoir to said pressure space; and an actuating device for operating said OPEN-CLOSE valve, said actuating device being operatively connected to said electronic control unit whereby under the action of the enabling pulses it opens or closes said OPEN-CLOSE valve.

7. A system as claimed in claim 1, in which said mechanical device is an internal combustion engine vehicle, said drive unit consists of control means of the group of an accelerator pedal and said driven unit is a throttle lever and an injector pump control lever.

8. A system as claimed in claim 7, in which the operating parameter to be sensed and controlled is the road speed of the vehicle and in which the sensor means is a speed sensor adapted to be coupled to a rotating member of the vehicle whose rotational speed is proportional to the road speed, and said control pulse monitor unit is a conventional frequency monitor unit.

9. A system as claimed in claim 8, in which said speed sensor comprises a light source and a photosensitive diode and a rotatable shaft carrying an interrupter arm and adapted to interrupt a light beam from said light source to said photosensitive diode, said rotatable shaft being coupled to a rotating member of the vehicle whose rotational speed is proportional to the road speed and the output from said photosensitive diode being connected to said pulse monitor unit.

10. A system as claimed in claim 8, in which said speed sensor comprises a magnetic yoke pole carrying an input winding which remains continuously energised and an output winding connected to the electronic control unit, a rotatable shaft carrying a slotted disc having teeth matching the yoke ends of the yoke pole, said rotatable shaft being coupled to a rotating member of the vehicle whose rotational speed is proportional to the road speed.

11. A system as claimed in claim 7, in which the operating parameter to be controlled is the road speed of the vehicle and the control parameter to be sensed is the load on said vehicle; the sensor means being a conventional over-load sensor located on the vehicle such that it can sense that the vehicle is over-loaded and generate corresponding control pulses; and said pulse monitor unit is a conventional frequency monitor unit.

12. A system as claimed in claim 7, in which the operating parameter to be controlled is the road speed of the vehicle and the control parameter to be sensed is said engine temperature; the sensor means being a conventional temperature sensor able to sense the engine temperature and generate corresponding control pulses; and said pulse monitor unit is a conventional frequency monitor unit.

13. A system as claimed in claim 7, in which the operating parameter to be controlled is the road speed of the vehicle and the control parameter to be sensed is the oil pressure in said engine; the sensor means being a conventional fluid pressure-sensing device adapted for connection to the engine of the vehicle so as to sense the oil pressure and generate corresponding control pulses; and said pulse monitor unit is a conventional frequency monitor unit.

* * * * *